March 4, 1947. C. RICHTER 2,416,846
OSCILLATING PISTON INTERNAL COMBUSTION ENGINE
Original Filed July 12, 1941 6 Sheets-Sheet 3
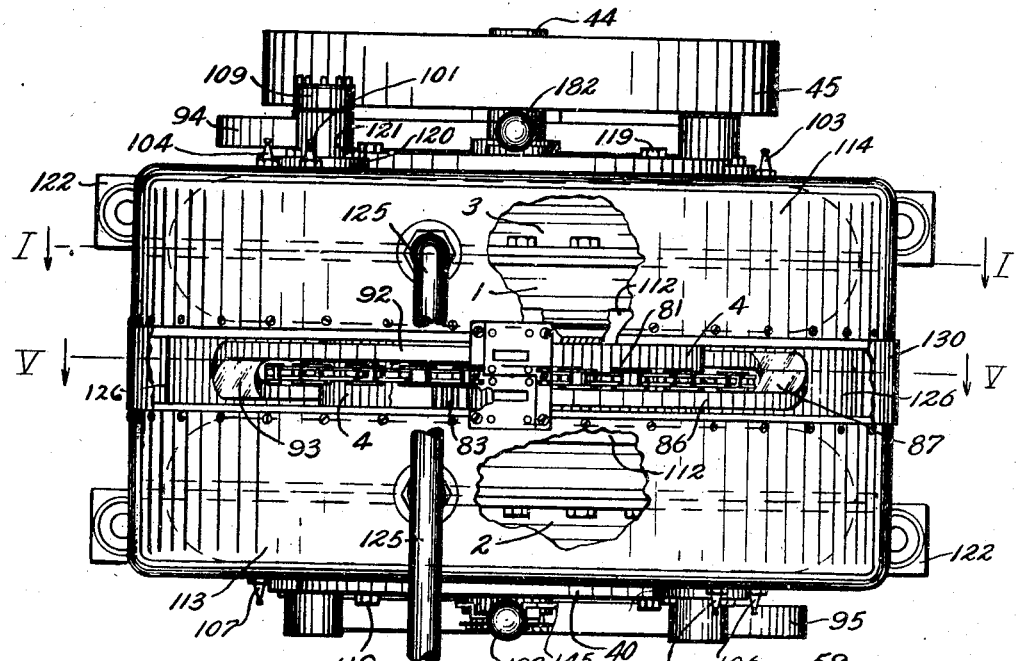
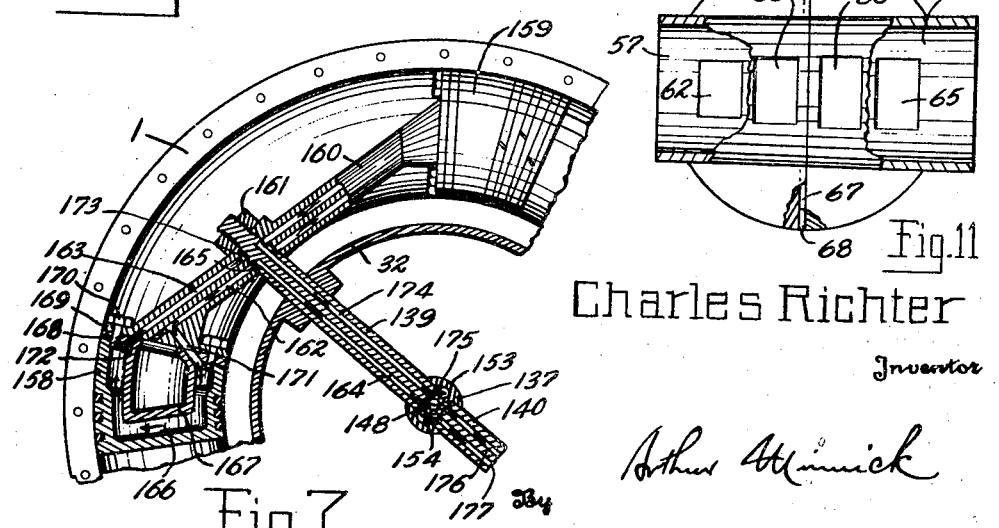
Charles Richter
Inventor March 4, 1947.  C. RICHTER  2,416,846
OSCILLATING PISTON INTERNAL COMBUSTION ENGINE
Original Filed July 12, 1941    6 Sheets-Sheet 4

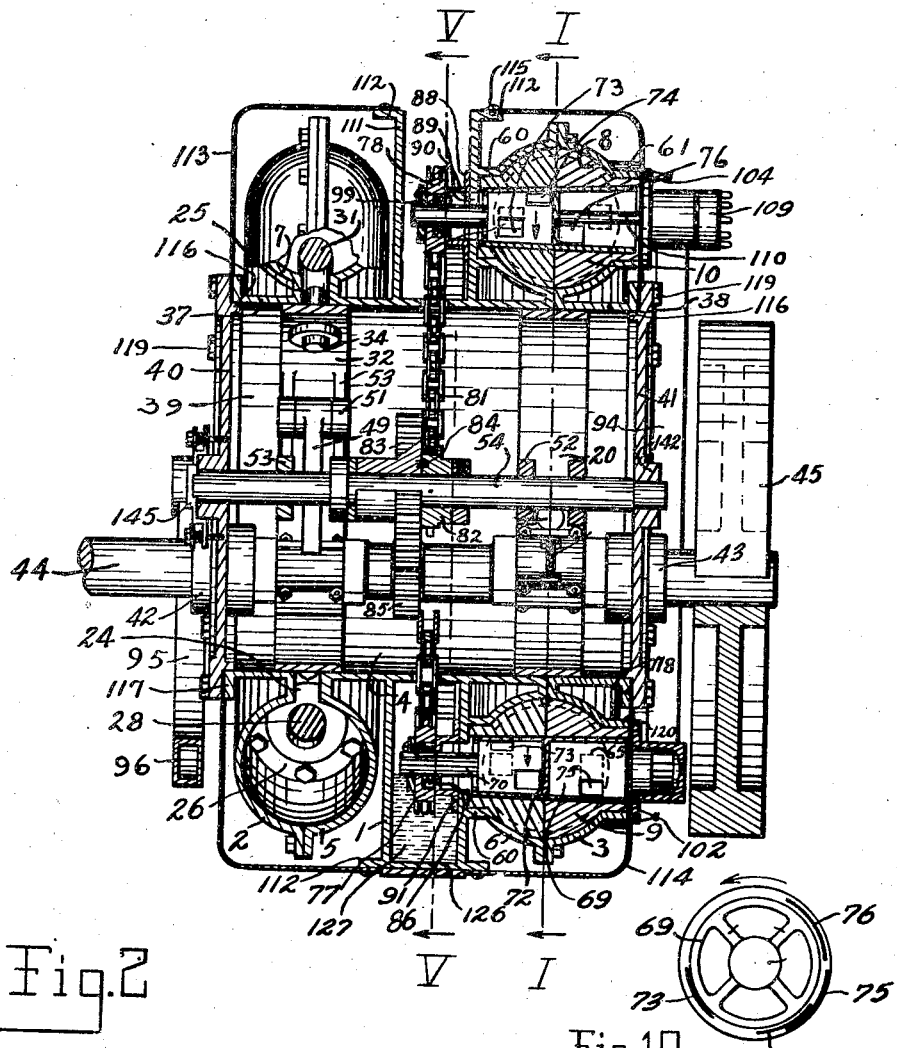

Charles Richter
Inventor
By Arthur Minnick
Attorney

March 4, 1947.  C. RICHTER  2,416,846
OSCILLATING PISTON INTERNAL COMBUSTION ENGINE
Original Filed July 12, 1941  6 Sheets-Sheet 5

Charles Richter
Inventor

By [signature]
Attorney

March 4, 1947.  C. RICHTER  2,416,846
OSCILLATING PISTON INTERNAL COMBUSTION ENGINE
Original Filed July 12, 1941  6 Sheets-Sheet 6

Charles Richter
Inventor

Patented Mar. 4, 1947

2,416,846

UNITED STATES PATENT OFFICE 2,416,846

OSCILLATING PISTON INTERNAL-COMBUSTION ENGINE

Charles Richter, Tampa, Fla.

Substituted for abandoned application Serial No. 402,063, July 12, 1941. This application November 20, 1944, Serial No. 564,288

7 Claims. (Cl. 123—18)

This application is a substitute for application No. 402,063, filed July 12, 1941.

The present invention has for its primary object to provide an internal combustion motor of simple construction and assembly and one having small volume in proportion to its power.

A further object of the invention is to provide a motor in which a plurality of pistons oscillate in fixed paths determined by a supporting element of large bearing surface relieving the crank shaft of the weight of the pistons, reducing wear by eliminating piston slap and side thrust, distributing strains and stresses over a large area of light yet rigid construction, and cushioning shocks to absorb vibration.

Another object of the invention is to provide a construction comprising castings that can readily be machined and having the number of parts reduced to a minimum to lower the cost of manufacture and assembly.

A still further object of the invention is to provide a structure so designed and having the parts so related as to facilitate construction and assembly while obtaining great strength with light weight to resist pressure spread over an extended area.

Other objects are to utilize the benefits of leverage in the application of the power of the pistons, to dispense with the multiplicity of parts involved in the ordinary valve arrangement by using a single silent valve for each two adjacent combustion chambers, and to furnish an efficient cooling system of light weight by making the liquid chamber of sheet metal.

Figure 1:
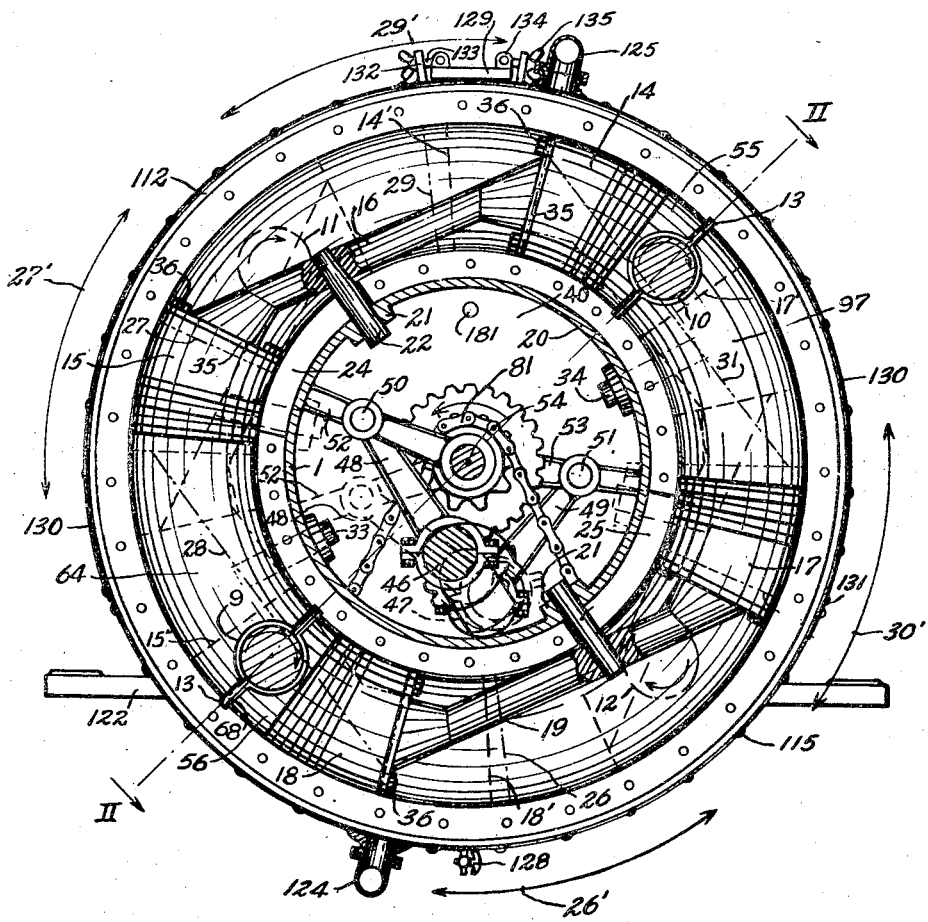
Figure 4:
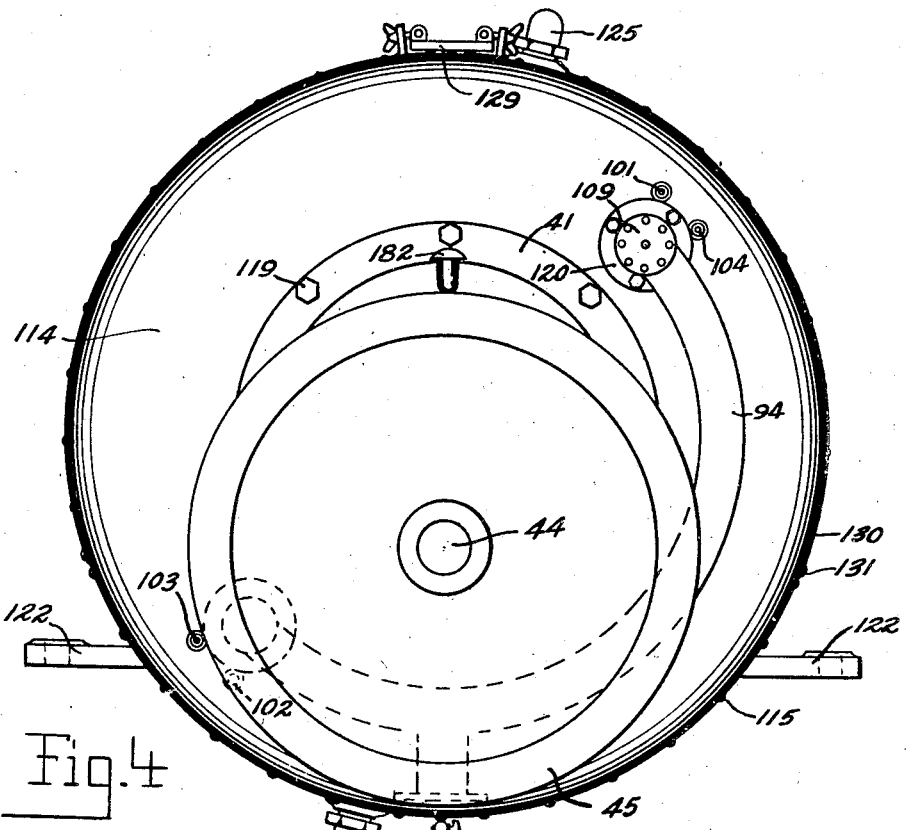
Figure 8:
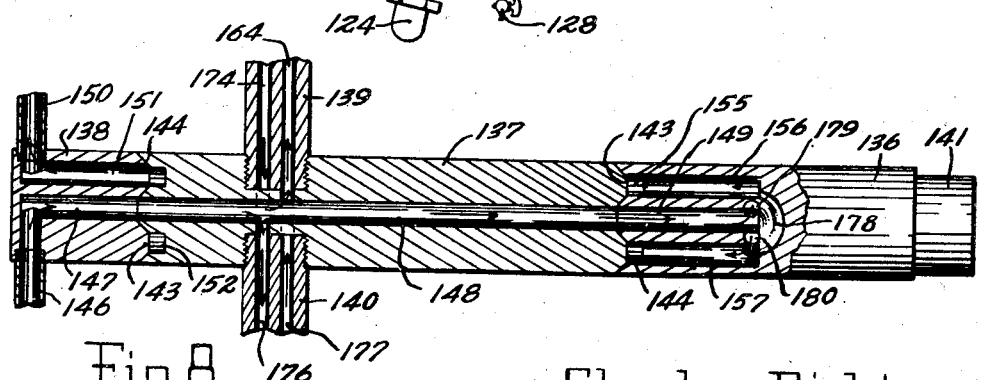
Figure 5:
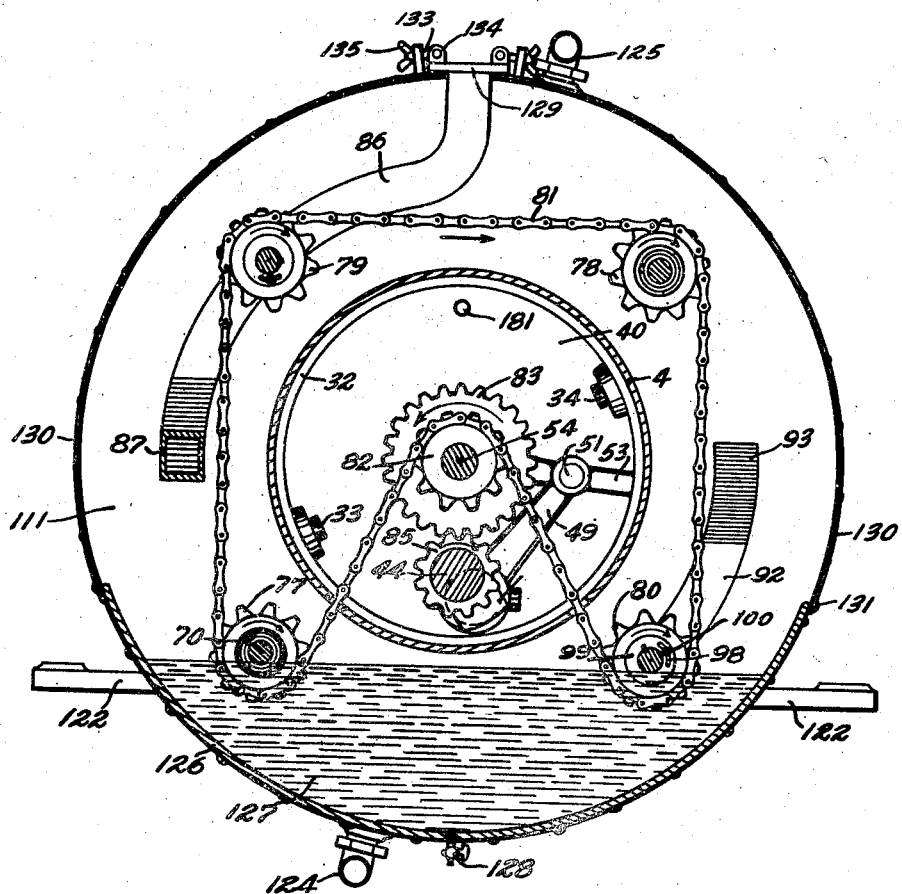
Figure 6:
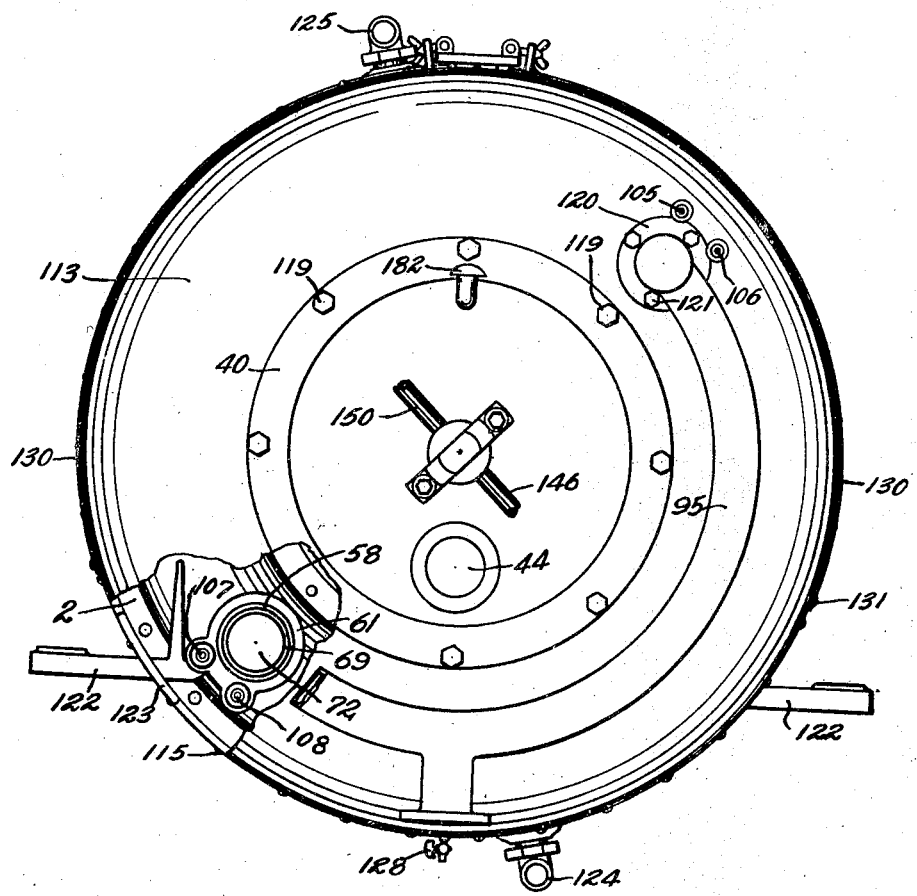

Other advantages and purposes of the invention will appear in the description of the structure and operation of a preferred embodiment illustrated in the accompanying drawings, in which Figure 1 is a transverse vertical section on the plane I—I of Figs. 2 and 3; Fig. 2 is a longitudinal section on the plane II—II of Fig. 1; Fig. 3 is a plan view with parts broken away to reveal details in the interior; Fig. 4 is a front elevation of the device; Fig. 5 is a vertical transverse section on the plane V—V of Figs. 2 and 3; Fig. 6 is a rear elevation of the device; Fig. 7 is a fragmentary section through a modification of the piston construction; Fig. 8 is a longitudinal section on an enlarged scale of the central shaft of the modification shown in Fig. 7; Fig. 9 is a longitudinal section through one of the rotary valves with a central portion shown in plan; Fig. 10 is an end view of the valve of Fig. 9; and Fig. 11 is a plan view of the valve casings with parts broken away and parts in section.

The motor illustrated in Figs. 1 to 6 inclusive is of the four-cycle type, having eight combustion chambers. As best seen in Fig. 2, there is a central casting 1 to which are secured outer castings 2 and 3. The casting 1 has a cylindrical center portion 4 and the outwardly facing annular channel portions 5 and 6 which confront similar channels 7 and 8 in castings 2 and 3 respectively, to form two passageways, each in the form of a torus, circular in cross section longitudinally and transversely, as shown in Figs. 1 and 2. It will be seen that the interior surfaces of these passageways can be machined and polished in a lathe.

Across each of these passageways, are set two valve casings, 9 and 10 in one, and 11 and 12 in the other, having flanges which fit into grooves 13 cut in the walls of the channels 5, 6, 7, and 8. The valve casing 9 is diametrically opposite the casing 10 in one passageway, and the casing 11 is diametrically opposite the casing 12 in the other passageway. Casings 9 and 10 are each half way between the casings 11 and 12 circumferentially of the castings.

Pistons 14 and 15 connected by bars 16, and pistons 17 and 18 connected by bar 19 are mounted to oscillate within one of the passageways toward and from the valve casings 9 and 10. A ring 20 slidably engages the smooth, interior, bearing surfaces of castings 1 and 3, these cylindrical surfaces being concentric with the passageways. Bosses 21 formed upon the ring carry radial arms 22 and 23 which are secured to bars 16 and 19 respectively, so that the four pistons, connected in pairs and facing oppositely in each pair, move simultaneously as a unit with the ring. The castings 1 and 3 have spaces 24 and 25 formed between their adjacent flanges of sufficient length to permit the necessary oscillation of the arms 22 and 23. The weight of the pistons is carried by the ring and their rigid connection with each other and with the ring prevents lateral movement which could cause slap or wear within the passageways.

Pistons 26 and 27 connected by bar 28 and pistons 29 and 30 connected by bar 31 are indicated by dot and dash lines in Fig. 1, the bars 28 and 31 being attached to the ring 32 by arms 33 and 34. The ring 32 is carried by the inner cylindrical portions of castings 1 and 2 which form a smooth bearing for oscillation of the ring to guide the movement of the four pistons as a unit in the passageway between the castings 1 and 2, approaching the valve casings 11 and 12. For easy machining, the bars 16, 19, 28, and 31 will each be formed with flanges 35 to which the pistons may be secured by screws 36.

The central cylindrical portions 37 and 38 of the castings 2 and 3 aline with the portion 4 of casting 1 to form a cylindrical chamber 39, the outer ends of which are closed by plates 40 and 41 having bearings 42 and 43 for a crank shaft 44 which carries a fly wheel 45. This shaft has two cranks 46 and 47 at 180° difference of phase from which connecting rods 48 and 49 extend to pivotal connections 50 and 51 on arms 52 and 53, one end of each arm being pivotally mounted on a central shaft 54 carried axially of the chamber 39 by the end plates 40 and 41, and the other end of arm 52 being secured to the ring 20 while the other end of the arm 53 is secured to the ring 32. In Fig. 2, the arm 53 is shown as being double, with the rod 49 between the two elements of the arm. This driving connection between the cranks and the oscillating rings will, of course, determine the extent of oscillation of the pistons carried by the rings. The pistons oscillate in their passageways at a distance from the center of the passageway to the center of the shaft 54 shown as about two and one half times the distance from the center of the pivot 50 to the center of the shaft 54. The effective thrust of the pistons on the crank shaft is thus increased by the leverage of its mode of application.

In Fig. 1, the piston 14 is shown as close to the valve casing 10, the space between the end of the piston and the casing forming a combustion chamber 55. The piston 18, at the same time, is close to the valve casing 9, the space between them forming the combustion chamber 56. In Fig. 11, which is seen from the same side as in Fig. 2, the valve casing is shown as constructed in two parts, each having a slightly tapering tubular portion 57 or 58, and having side flanges 59 fitting closely at their rims in the grooves 13 cut in the channel walls centrally of the tubular portions 60, 61, cast integrally with the members 2 and 3. In one side of the portion 57 is an intake port 62, indicated in broken lines in Fig. 2, to serve the chamber 56, and in the other side is the intake port 63 to serve the arcuate combustion chamber 64 between the end of the piston 15 and the valve casing 9. In the portion 58, the exhaust port 65 is on the same side of the casing as the intake port 62 to serve the chamber 56, and the exhaust port 66 is on the other side to serve the chamber 64. At their meeting edges, the flanges 59 have a tongue-and-groove engagement, the tongue 67 on the portion 58 fitting closely within the groove 68 in the portion 57. Each half of the valve casing can thus be fitted into its casting before the castings are assembled and connected.

The tapering valve 69, shown in Fig. 9 in the same position as in Fig. 2, is mounted for rotation within the tubular portions 57, 58 of the casing 9, being held therein by a spring action later to be described. The direction of rotation of the valve is indicated in each of Figs. 1, 2, 5, 9, and 10 by an arrow. At one end, a shaft 70 is shown in Fig. 10 as secured to the tubular body of the valve by arms 71. Across the central section of the body is a partition 72 which may be cast integrally with the body or secured in place by brazing or welding. On one side of the partition, the body has formed therein intake valve ports 73 and 74 and on the other side of the partition are formed the exhaust ports 75 and 76. These ports are at different distances from the partition, so that as the valve rotates, the port 73 can register only with the port 62, the port 74 only with the port 63, the port 75 only with the port 65, and the port 76 only with the port 66. The portion of the valve periphery between ports 74 and 76 covers the joint between the members 57 and 58.

As may be noted by an inspection of Fig. 3, Fig. 5 is a vertical section through the motor on the plane V—V directly behind the plane I—I and seen from the same direction, as is indicated by the arrows. The sprocket wheels 77, 78, 79, and 80 are severally secured to the shafts of the valves which rotate in valve casings 9, 10, 11, and 12, respectively. The chain 81 connects these sprockets to rotate all four of them in the same clockwise direction indicated by the arrows. The chain is driven by a sprocket 82 pivoted on the shaft 54 and engaged with the gear wheel 83 by a pin 84 or in any other suitable manner. The gear wheel 83 also rotates on the shaft 54 and is driven by the gear 85 formed on the crank shaft 44 and having half of the pitch diameter of the gear 83. Two revolutions of the crank shaft drive each valve through a single complete revolution.

An intake manifold 86 is shown in Fig. 5 extending downward from the top on the far side behind the sprocket 79 and is shown in section about half way down on the left as it crosses over at 87 (Fig. 3) to the near side of the section plane to supply the valve 69 as seen in Fig. 2. The manifold 86 has a flange 88 surrounding a port 89 in the manifold which registers with a port 90 in the casting 1 at the valve casing 10. A similar flange 91 and ports are shown in Fig. 2 at the valve 69 where the manifold 86 terminates at the valve casing 9.

A second intake manifold 92 is shown in Fig. 3, extending toward the left in that figure and crossing to the near side of the section plane V—V. In Fig. 5, seen looking in the direction of the arrows in Fig. 3, the manifold 92 appears at the right, extending downward from the crossing over at 93 to the rear of the sprocket 80 to supply the valve casing 12. The two intake manifolds are thus on the interior of the motor casing. The exhaust manifolds are on the exterior as seen in Figs. 2, 3, 4, and 6, the manifold 94 at the front serving valve casings 9 and 10 and the manifold 95 at the rear end serving valve casings 11 and 12. In Fig. 2, the manifold 95 has the portion above the section plane II—II cut off as indicated at 96, only the lower portion serving valve casing 12 being seen in this view. Each of the valve casings is thus served at its inner end by an intake manifold and at its outer end by an exhaust manifold.

In Fig. 1, the pistons 14 and 18 are shown as at their nearest approach to the valve casings 10 and 9 respectively, with the crank 46 at a dead center moving clockwise. The crank 47 is at 180° of rotation from the crank 46 with the connecting rod 49 extending upward to the right to the arm 53, so that the ring 32 is being moved clockwise and the front ends of the pistons 27 and 30 are at the dot and dash position indicated by the lines to which the numerals 27 and 30 are applied and are moving toward valve casings 11 and 12. The valve casings are 90° apart around the axis of the motor and the difference of phase of the two cranks causes two pistons to reach the end of a stroke at each 90° of rotation of the crank shaft.

The original selection of the firing order of the combustion chambers is arbitrary for two strokes on each side with eight possible orders, but in the case illustrated, piston 14 is supposed to be at the end of its compression stroke and piston 15 at the end of its power stroke. The valve ports and their relative amount of rotation are so adjusted that both the intake and exhaust ports of the valve casing 10 are closed on the side toward the chamber 55, the intake port 74 and exhaust port 76 being on the opposite side of the valve, as seen at the upper right in Fig. 2.

Piston 17 has completed its intake stroke, being at its most remote position from the valve casing 10, but the valve intake port 73 is still opposite the casing intake port 62 for the combustion chamber 97 and it will remain open for about 45° of rotation of the crank shaft 46 past its dead center, as is the familiar practice. The exhaust port 65 of valve casing 9 is still open for the chamber 56, the valve exhaust port 75 of the valve 69 having nearly completed its period of travel across the port 65 which it will close in another 10° of rotation of the crank shaft (or 5° of the valve). The intake port 73 of the valve 69 is shown as closely approaching the casing port 62, which it will open at 5° of rotation of the crank shaft after the closing of the exhaust port 65. The exhaust port 76 for the chamber 64 is already open, as can be seen from its position in Fig. 9, since it opens before the end of the power stroke of piston 15.

The valve ports will be cut to give the proper sequence and the proper period of being open and closed to correspond with the size and location of the valve casing ports. The valves are connected by the chain 81 for simultaneous rotation and each valve will be set in the proper angular relation to all the others when the chain is placed upon the sprockets. Any necessary angular adjustments of less than the angular interval between two sprocket teeth are accomplished by the use of a slot 98 in a collar 99 secured to the shaft 70 and a screw 100 within the slot and engaging the sprocket to hold the shaft of the valve in the final adjusted position. Each sprocket has a recess on the side adjacent to the intake manifold for a light spring which exerts a constant tension longitudinally of the tapering valve to hold it snug in its seat so that it will not become loose with wear and so that it will not bind when the valve becomes hot. Such a spring 77' or 78' is seen in Figs. 2 and 5 in sprockets 77 and 78.

Each of the eight pistons will have the standard four-cycle, intake, compression, power, and exhaust strokes to provide a power stroke for the motor at each 90° of rotation of the crank shaft.

Broken lines consisting of dashes of substantially uniform length are used in Fig. 1 to indicate the position of parts at the other extreme of oscillation of the ring 20 and its associated elements 14, 15, 16, 17, 18, and 19 from the solid line position already described. The front end of the piston 14 will move to the line 14' while the front end of the piston 15 will reach the line 15'. The front end of piston 17 will move to the line 17' and the front end of the piston 18 will reach the line 18'. The connecting rod 48 will then be in the position 48' and the arm 52 will be at 52'.

The extreme angular range of movement of the front ends of each of the pistons 26, 27, 29, and 30 is indicated by the angular distances between the arrow heads at the ends of the arcs designated 26', 27', 29', and 30' respectively. The angular position reached by the front ends of these pistons is indicated in each instance by the point of application to the arc of the lead line from the designating numeral, all the pistons of this group being at that time in motion clockwise.

The spark plugs for the combustion chambers 55, 56, 64, and 97 respectively are indicated at 101, 102, 103, and 104 in Fig. 4, which is an exterior view, these plugs being in communication with their chambers through openings formed in the castings at the valve castings in channel 8 of casting 3, this channel being removed to give the view seen in Fig. 1. Spark plugs for the rear chambers are indicated at 105, 106, 107, and 108 in Fig. 6. The plugs will be connected in any suitable manner (not shown) with the distributor 109 indicated as mounted on a shaft 110 secured to the partition 72 of the valve at the upper right in Fig. 2. The valve rotates only once in two revolutions of the crank shaft and this will also be true, of course, for the distributor, so that any suitable distributor of the simplest type may be provided. As such details form no part of the present invention, it has been deemed unnecessary to illustrate any specific form.

The radial webs 111 of casting 1 have cylindrical flanges 112 to receive the rims of sheet metal water jackets 113 and 114 which are secured to the flanges by screws 115. Each jacket has a central opening to receive a cylindrical flange 116 on the end plate 40 or 41. Around the edges of these openings, the jackets are clamped against flanges 117 and 118 on castings 2 and 3 by the outer rims of plates 40 and 41 secured in place by screws 119.

Openings are also formed in these jackets opposite each of the valves, the sheet metal being held against the outer ends of the tubular members 61 of the castings 2 and 3 by flanges 120 on the exhaust manifolds held in place by screws 121. The jackets are also cut out to receive the legs 122 formed as part of the castings 2 and 3, these legs having laterally projecting webs 123 to provide additional strength and to form a smooth surface against which the jacket may bear to form a liquid-tight joint.

Secured upon the bottoms of these jackets is an inlet manifold for water which flows upward around the combustion chambers and out at an outlet manifold 125 on the top.

Connecting the lower portions of the radial webs 111 is a transverse web 126 forming an oil pan of sufficient depth to permit the sprockets 77 and 80 and the chain 81 which runs upon them to be partially immersed in a bath of oil as indicated at 127. A petcock 128 is provided to drain out the oil when desired.

As a means for closing the spaces between the webs 111 from the oil pan web 126 to the flanges of the intake manifolds 86, and 92 at the top of the motor as indicated at 129, two flexible metallic strips 130 are secured at their lower ends by screws 131 and at their upper ends are provided with ears 132 to be engaged by clamp bolts 133 pivoted between lugs 134 on the flanges 129 and having wing nuts 135 for easy release of these closures.

In the modification shown in Figs. 7 and 8, means are provided for cooling the interiors of the pistons by a flowing liquid. The shaft members 136, 137, and 138 will replace the shaft 54, and the arms 139 and 140 will replace the arms 33 and 34. The end member 136 will be formed with a reduced end portion 141 to oscillate in the bearing 142 in the center of the plate 41 occupied by the right end of shaft 54 in Fig. 2. The central member 137 has one end formed with an annular, exteriorly and interiorly beveled boss 143 to fit within a liquid-tight ground joint formed as an annular recess 144 in the inner end of member 136, the recess 144 having corresponding annular bevels matching those of the boss. The other end of the member 137 has a similar ground joint connection with the member 138 which is held pressed into contact with the member 137 by a spring yoke 145 seen at the left in Fig. 2.

An inlet pipe 146 communicates with a central inlet passage 147 in the member 138 which is in alinement with a passage 148 in the member 137 and a passage 149 in the member 136. An outlet pipe 150 communicates with a passage 151 bored in the member 138. At its inner end, the passage 151 opens into an annular groove 152 in the adjacent end of the member 137 between the two beveled surfaces of the annular bearing. As seen in Fig. 7, the member 137 has two passages 153 and 154 on opposite sides of the central passage 148. These outlet passages cannot be seen in Fig. 8, one of them being directly behind the passage 148 and the other being in the portion cut away on the observer's side of the section plane. Both of these passageways discharge into the annular groove 152 and at their other ends communicate with the annular groove 155 formed in the adjacent end of the member 136. Two outlet passages 156 and 157 formed in the member 136 discharge into the groove 155. In Fig. 7, pistons 158 and 159 are shown as connected by the bar 160, to which is secured the outer end of the arm 139 shown as tapered at the end which fits into the bar 160 and held in place by the nut, 161.

The bar 160 has two longitudinal bores, of which 162 acts as an inlet for the cooling liquid and 163 serves as an outlet. In the arm 139, the bore 164 communicates at one end with the inlet passage 148 in the member 137, and at the other end, discharges into the bore 162. A groove 165 extending around the outside of the arm 139 at the inlet bore 162 and communicating with the bore 164 forms a channel through which the liquid may pass from the bore 164 to both pistons. At the lower left in Fig. 7, the piston 158 is shown in section as formed with an inner chamber 166 in which is secured a cup 167 having a flange 168 on which rests the flange 169 on the end of the bar 160. The screws 170 pass through both flanges to secure the piston to the arm.

The space between the cup and the inside of the piston forms the internal water jacket to cool the piston. Water or other cooling liquid enters this space at one side through the passage 171 and leaves at the other side through passage 172 which leads to the bore 163 and through a groove 173 to the outlet bore 174 in the arm 139, which in turn discharges through a cross bore 175 into the outlet passage 153 leading to the groove 152 discharging through the passage 151 into the pipe 150.

The piston 159 may be a duplicate of piston 158, as are also the pistons on the other side of the ring 32 served by the arm 140 through inlet passage 176 and outlet passage 177.

At the right in Fig. 8, the member 136 has a portion broken away to show the inner end of an arm 178 which sets at right angles to arms 139 and 140, being one of a pair of arms for the other two pistons on ring 20 (not shown in this view), in the other passageway on the other side of the motor. The arrows indicate the flow from the central bore 149 to the inlet passage 179 in the arm 178 and from the outlet passage 180 of the arm 178 to the passage 156 and the groove 155. The cooling liquid may thus flow freely and continuously through all of the pistons during all phases of their oscillations.

The central crank case is shown as having breathers 181 at each end plate 40 or 41, protected on the outside by a cap 182.

While a structure having eight pistons has been shown and described, it is evident that the device may readily be adapted to use only four pistons, or any multiple of four, as twelve, sixteen, or twenty. It has not been deemed necessary to illustrate such duplications, but it will be understood that the invention is not to be considered as limited to the details of construction and operation chosen for purposes of illustration, but the claims are to be construed broadly within their legitimate scope as limited only by the prior art.

I claim:

1. In an internal combustion motor, in combination, a carrier ring having an outer cylindrical bearing surface, a support having an internal bearing surface upon which the bearing surface of the ring is mounted for oscillatory sliding movement, a crank shaft extending through the ring and the support, a connecting rod pivotally connected to the ring between its bearing surface and its axis of oscillation, and connected at its end to the shaft, and means causing oscillation of the ring.

2. In an internal combustion motor, a support having an internal bearing surface, a ring having a cylindrical outer surface slidable upon the bearing surface of the support, a piston structure comprising four pistons, each piston being rigidly connected to the ring, an arcuate combustion chamber for each piston, a crank shaft extending through the cylindrical support, and a connecting rod pivotally connected at one end with the ring and at the other end with the crank shaft, whereby to convert oscillatory movement of the ring into rotary movement of the crank shaft, the point of pivotal connection of the connecting rod with the ring being between the ring and its axis of oscillation.

3. In an internal combustion motor, a cylindrical support, a ring slidably mounted thereon to oscillate about the axis of the support, arcuate combustion chambers concentric with the ring, a pair of oppositely directed pistons rigidly carried by the ring and each piston movable longitudinally of one of the combustion chambers, a crank shaft extending through the ring, and power transmitting means pivotally connecting the ring with the crank shaft to convert oscillatory movement of the ring into rotary movement of the shaft.

4. An internal combustion motor comprising a shaft, arcuate combustion chambers arranged in a common plane at right angles to the shaft, a cylindrical bearing member concentric with the shaft, a supporting member slidably oscillatable upon the bearing member, a piston oscillatable within each combustion chamber, means rigidly connecting the supporting member with each piston for simultaneous movement of all the pistons carried by the supporting member, an arm pivoted at one end upon the shaft and secured at its other end to the supporting member, a crank shaft extending through the cylindrical bearing member and rotating on an axis parallel with that of the first mentioned shaft, and a crank rod pivoted at one end to the crank shaft and at its other end to the arm to convert oscillating movement of the supporting member into rotary movement of the crank shaft.

5. In an internal combustion motor, a central casting having a cylindrical portion formed with two substantially parallel webs arranged radially of the cylindrical portion, each web having an annular channel concentric with the central cylindrical portion and facing outwardly from the web, two outer castings each having an annular channel in registration with one of the channels in the central casting and secured thereto, valve casings extending transversely of the registering channels to divide them into combustion chambers, the valve casings forming the ends of the chambers and having intake and exhaust ports formed therein for each chamber, valves in each valve casing having intake and exhaust ports in each valve to register with those in the casings, a piston oscillatable in each chamber and two cylindrical piston supporting members slidable upon the inner surface of the cylindrical portion of the central casting, each of said supporting members being rigidly connected with the pistons in the annular chamber adjacent thereto.

6. An internal combustion motor of the oscillating piston type having a central cylindrical member provided with radial webs formed on their outer surfaces with annular channels, outer members secured to the central member and each having an annular channel cooperating with the channel on the adjacent web of the central member to form a toroidal chamber coaxial with the central cylindrical member, two diametrically opposite valve casings extending transversely of each of the chambers to define combustion chamber ends, the end wall of each chamber having intake and exhaust ports formed therein, a rotary valve in each casing formed with intake and exhaust ports registering with the cooperating ports in the casing, plates forming end walls for the cylindrical central member to form a closed chamber, a shaft supported by the end plates axially of the chamber, a crank shaft extending longitudinally of the chamber and having two cranks, two rings, each slidably mounted for oscillation upon the inner surface of the chamber and each having a connecting rod pivotally connected therewith and with one of the cranks, and oppositely directed pistons carried by each of the rings in each of the halves of the toroidal chambers for oscillation toward and from the valve casings in paths limited by their connections with the crank shaft.

7. In an internal combustion motor, a crank case comprising a cylindrical chamber having end plates forming end walls for the chamber and having bearings therein for two shafts, an axial shaft and a crank shaft parallel therewith and having two cranks, two rings having their outer surfaces slidably mounted upon the cylindrical surface of the chamber, each ring having an arm carried at one of its two ends by the ring, each arm being pivoted at its other end upon the axial shaft, connecting rods each having one end mounted upon a crank of the crank shaft and pivoted at its other end to a central portion of its cooperating arm, arcuate combustion chambers formed coaxially with the crank case, and pistons carried by the rings for oscillation within the combustion chambers to cause oscillation of the rings.

CHARLES RICHTER.

REFERENCES CITED

The following references are of record in the file of this patent:

UNITED STATES PATENTS

| Number | Name | Date |
| --- | --- | --- |
| 2,282,999 | Engelke | May 12, 1942 |
| 1,738,963 | Norton | Dec. 10, 1929 |
| 2,156,541 | Misenhimer et al. | May 2, 1939 |
| 1,809,577 | Wolff | June 9, 1931 |
| 2,154,315 | Moraway | Apr. 11, 1939 |

FOREIGN PATENTS

| Number | Country | Date |
| --- | --- | --- |
| 456,246 | France | 1913 |